(12) United States Patent
Zanetti et al.

(10) Patent No.: US 7,302,336 B2
(45) Date of Patent: Nov. 27, 2007

(54) METHOD AND DEVICE FOR CONTROLLING AN INTERNAL COMBUSTION ENGINE

(75) Inventors: Bruno Zanetti, Villereuve lez Avignon (FR); Michael Neuner, Leinfelden Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 263 days.

(21) Appl. No.: 10/531,910

(22) PCT Filed: Jul. 10, 2003

(86) PCT No.: PCT/DE03/02318

§ 371 (c)(1),
(2), (4) Date: Oct. 31, 2005

(87) PCT Pub. No.: WO2004/040114

PCT Pub. Date: May 13, 2004

(65) Prior Publication Data

US 2006/0122764 A1 Jun. 8, 2006

(30) Foreign Application Priority Data

Oct. 17, 2002 (DE) .............................. 102 48 603

(51) Int. Cl.
*F02D 41/30* (2006.01)

(52) U.S. Cl. ..................................... 701/104

(58) Field of Classification Search ................ 701/104, 701/103, 105, 110, 102; 123/478, 480
See application file for complete search history.

(56) References Cited

U.S. PATENT DOCUMENTS

| | | | |
|---|---|---|---|
| 5,282,450 A | * | 2/1994 | Uchida et al. ............... 123/399 |
| 5,386,810 A | * | 2/1995 | Gronenberg et al. ......... 123/436 |
| 5,906,188 A | | 5/1999 | Ihara et al. |
| 6,170,459 B1 | | 1/2001 | Ohuchi et al. |
| 6,354,274 B1 | | 3/2002 | Hitoshi et al. |

FOREIGN PATENT DOCUMENTS

| | | | |
|---|---|---|---|
| DE | 198 54 046 A1 | * | 5/1999 |
| EP | 0 478 972 | | 4/1992 |
| JP | 64-45942 A | * | 2/1989 |
| JP | 2-33432 A | * | 2/1990 |

* cited by examiner

*Primary Examiner*—Hieu T. Vo
(74) *Attorney, Agent, or Firm*—Kenyon & Kenyon LLP

(57) ABSTRACT

A method and a device are described for controlling an internal combustion engine, particularly for controlling the injected fuel quantity. Starting from operating parameters, a variable being able to be specified that characterizes the fuel quantity, starting from which, activating signals for an actuator are specified. Starting from the rotary speed, the variable characterizing the fuel quantity and a variable characterizing the start of delivery, a correcting value for the correction of the variable characterizing the fuel quantity is specified.

8 Claims, 1 Drawing Sheet

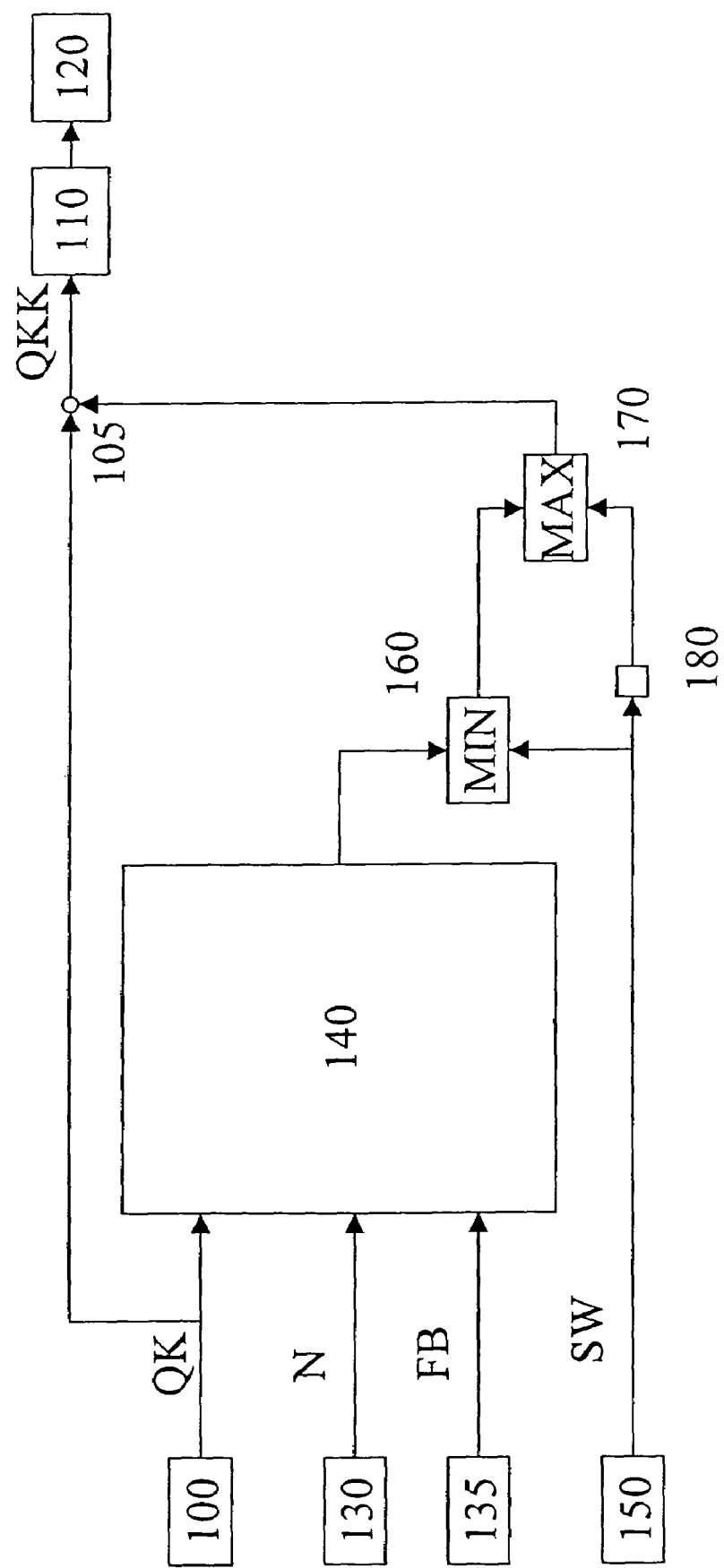

METHOD AND DEVICE FOR CONTROLLING AN INTERNAL COMBUSTION ENGINE

FIELD OF THE INVENTION

The present invention relates to a method and a device for controlling an internal combustion engine, particularly for controlling the injected fuel quantity. In the control of internal combustion engines, starting from operating parameters, a variable is specified that characterizes the fuel quantity. The variable characterizing the fuel quantity preferably concerns the fuel quantity, the duration of control for a actuator or another variable that characterizes the fuel quantity to be injected, such as the torque. Starting from this variable that characterizes the fuel quantity, control signals are specified for one or more actuators that influence the fuel metering.

BACKGROUND INFORMATION

As actuators, especially so-called pump-nozzle units are used, in which the pressure buildup and the control of the injected fuel quantity take place in a structural unit, or pump-line-nozzle systems are used. Correspondingly, as actuator, an injector may also be used to which the fuel is supplied under high pressure, and the injector merely controls the fuel metering.

Usually such actuators are encumbered with tolerances. This means that, for the same control signal, different injectors meter in different fuel quantities. Furthermore, tolerances are able to have the effect that, in response to the same operating conditions, for the same control signal, different fuel quantities are metered in.

SUMMARY OF THE INVENTION

Because, starting from the rotary speed, from a variable characterizing the fuel quantity and from a variable characterizing the start of delivery, a correcting value for correcting the variable characterizing the fuel quantity is specified, tolerances, especially in the field of actuators, may be clearly reduced. This results in clearly more accurate fuel metering and thereby lower emissions.

BRIEF DESCRIPTION OF THE DRAWING

The FIGURE shows a block diagram of the device according to the present invention.

DETAILED DESCRIPTION

A quantity specification 100 specifies a quantity QK characterizing the fuel quantity to be injected. This usually reaches a control specification 110, which converts this signal into control signals for controlling a actuator 120. Corresponding methods and devices are known and are usually converted in engine control devices.

Output signal QK of the quantity specification, output signal N of a first sensor 130, output signal FB of a start of delivery control 135 make their way to an adjustment characteristics map 140, and output signal SW of a threshold value specification 150 reach a minimum selection 160. The output signal of minimum selection 160 reaches a maximum selection 170, at whose second input there is present the output signal of a sign change 180, that also has signal SW of threshold value specification 150 applied to it. A node 105 has applied to it output signal K of maximum selection 170, and at its second input the output signal of quantity specification 100 is present. Output signal QKK of node 105 is then applied to a control specification 110, which, in turn, correspondingly activates actuator 120.

As a rule, these elements are components of a control unit which activates the actuator. In internal combustion engines having several actuators, the elements should be designed in multiple fashion.

In adjustment characteristics map 140, as a function of various variables, correcting values K are stored, using which the fuel quantity QK to be injected is corrected. This correction is made in such a way that tolerances of the individual actuators are adjusted, that is, correcting values K are specified in such a way that all actuators measure in the same fuel quantity in response to the same signal of the quantity specification. Furthermore, correcting values K are specified in such a way that a actuator, at the same operating condition, especially at the same rotary speed, at the same start of delivery and at the same output signal QK of the quantity specification, meters in the same fuel quantity.

In this connection, it is particularly advantageous that, besides the fuel quantity and/or rotary speed N, in addition a signal that characterizes the start of delivery, is drawn upon to specify correcting value K. This is advantageous especially in systems in which the start of delivery influences the fuel quantity to be injected. This is so, in particular, in the case of so-called pump-nozzle systems and/or in the case of so-called pump-line-nozzle systems. As the signal that characterizes the start of delivery, preferably a signal is used that indicates the angular position of the crankshaft or the camshaft, at which the injection begins. Alternatively, signals may also be used that indicate the beginning of the activation of the actuator.

Instead of the fuel quantity QK to be injected, alternatively a torque quantity, a signal that characterizes the duration of control, or another signal that characterizes the fuel quantity to be injected, may be used.

It is usually provided that an adjustment characteristics map 140 is assigned to each actuator, that is, to each pump-nozzle system. In this context, it is provided that the adjustment characteristics map is ascertained subsequently to the manufacture of the actuator. The data thus ascertained are then assigned to the actuator in a suitable manner, and, when the actuator is put into operation for the first time, the data are read into the control unit for the control of the internal combustion engine, and are stored in a suitable manner. During running operation, the correction according to the present invention then takes place based on these stored values.

In this context, various alternatives may be provided. On the one hand, the complete characteristics map may be ascertained, assigned to the actuator and then stored. On the other hand, it is possible to determine correcting values only at individual operating points, and to assign these to the actuator. During first operation, starting from these individual correcting values, the remaining characteristics map values may then be ascertained by using a suitable method. Alternatively, it may also be provided that the calculation takes place constantly. This procedure offers the advantage that only some few values have to be ascertained and assigned to the actuator.

The assignment of the data to the actuator may be developed in different ways. It may be provided, for instance, that the actuator and a data carrier, in which the data are inscribed, form a structural unit. On the other hand, it may be provided that the actuator and a data carrier, that includes an identification number, form a structural unit, and that then, in the light of this identification number, data are selected which, using another data carrier and/or a transmission means, are transmitted and then supplied to the control unit.

In one preferred specific embodiment, the output signals of the adjustment characteristics map are limited to maximum and minimum admissible values. For this, minimum selection 160 and maximum selection 170 are provided. Threshold value specification 150 specifies a threshold value which is directly supplied to the minimum selection and, with an inverted sign, to maximum selection 170. The result is that the output signal of the adjustment characteristics map is limited to a maximum absolute value by minimum selection 160 and maximum selection 170. This is of advantage particularly if the values of the adjustment characteristics map is calculated starting from a few test points. In that case it may happen that, on account of calculating accuracies and other effects, very large or very small correcting values occur, that should not be taken into consideration.

What is claimed is:

1. A device for controlling an internal combustion engine, including for controlling a fuel quantity injected, comprising:
    an arrangement for, starting from operating parameters, specifying a variable that characterizes the fuel quantity, starting from which activating signals for an actuator are specified; and
    an arrangement for, starting from a rotary speed, the variable characterizing the fuel quantity, and a variable characterizing a start of delivery, specifying correcting values for correcting the variable characterizing the fuel quantity.

2. A method for controlling an internal combustion engine, including for controlling a fuel quantity injected, comprising:
    starting from operating parameters, specifying a variable that characterizes the fuel quantity, starting from which activating signals for an actuator are specified; and
    starting from a rotary speed, the variable characterizing the fuel quantity, and a variable characterizing a start of delivery, specifying correcting values for correcting the variable characterizing the fuel quantity.

3. The method as recited in claim 2, further comprising: storing the correcting values in a characteristics map.

4. The method as recited in claim 2, wherein the correcting values are specified individually for the respective actuator.

5. The method as recited in claim 2, further comprising:
    ascertaining for each actuator and assigning thereto one of the correcting values and data starting from which the correcting values are determined.

6. The method as recited in claim 2, further comprising:
    ascertaining subsequently to a manufacture of the actuator one of the correcting values and data starting from which the correcting values are determined.

7. The method as recited in claim 2, wherein the correcting values are limited to admissible values.

8. The method as recited in claim 2, wherein the data are ascertained at certain test points.

* * * * *